US005611983A

United States Patent [19]
Ma et al.

[11] Patent Number: 5,611,983
[45] Date of Patent: Mar. 18, 1997

[54] PROCESS FOR PELLETIZING POLYMER

[75] Inventors: Chin-Yuan G. Ma, Sugar Land; Jerry W. Secrist, Houston, both of Tex.

[73] Assignee: Shell Oil Company, Houston, Tex.

[21] Appl. No.: 431,240

[22] Filed: Apr. 28, 1995

[51] Int. Cl.⁶ .................... B29B 9/06; A01J 21/02
[52] U.S. Cl. .................... 264/142; 425/67; 425/313
[58] Field of Search .................... 264/142; 425/313, 425/67

[56] References Cited

U.S. PATENT DOCUMENTS

| | | |
|---|---|---|
| 3,324,510 | 6/1967 | Kleeb . |
| 3,673,298 | 6/1972 | Miler . |
| 4,099,900 | 7/1978 | Bradbury et al. . |
| 4,321,026 | 3/1982 | Lambertus . |
| 4,529,370 | 7/1985 | Holmes et al. .................... 425/142 |
| 4,621,996 | 11/1986 | Hundley, III . |
| 4,728,275 | 3/1988 | Dilvllo et al. .................... 425/67 |

FOREIGN PATENT DOCUMENTS

| | | |
|---|---|---|
| 1220399 | 1/1971 | United Kingdom . |
| 2124964 | 2/1984 | United Kingdom . |

*Primary Examiner*—Jan H. Silbaugh
*Assistant Examiner*—Robin S. Gray
*Attorney, Agent, or Firm*—Grace Tsang

[57] ABSTRACT

An improved process for pelletizing thermoplastic material, particularly ultra low melt viscosity thermoplastic polymer, using an underwater pelletizer adapted to prevent extruded material from agglomerating in the pelletizer, which pelletizer comprising a cutting assembly having (1) a shroud fixedly mounted on the outer periphery of the cutting assembly thereby preventing pellets from being trapped between the die face and the cutting assembly; and (2) novel knives contoured to conform in their angular positions to the curvature of the shroud to avoid pellet agglomeration.

8 Claims, 6 Drawing Sheets

PROCESS FOR PELLETIZING POLYMER

FIELD OF THE INVENTION

This invention relates to an improved process for producing pellets of thermoplastics, particularly ultra low melt viscosity polyolefins, which process involves pelletizing thermoplastics utilizing an underwater thermoplastic pelletizers having improved means for cutting.

BACKGROUND OF THE INVENTION

It is known that underwater granulation or pelletizing is particularly effective for the granulation or pelletization of thermoplastic materials. Underwater pelletizers are known which employ a rotating disc cutter to cut or sever stranded polymer as it exits from the die plate of an extruder. The cutting is accomplished in a chamber full of circulating water which functions to cool the strand and also to carry away the cut pellets. The prior art disc cutters are of two types: (1) knives which extend radially from a central hub or (2) multiple blades which are attached to spoked hubs.

Attempts to use the prior art disc cutters to pelletize fluidic materials which require a relatively long time to solidify have resulted in agglomeration of extruded materials in the pelletizers. The extruded materials often are trapped in the area between the cutting hub and the die face and agglomerates into "trashouts". The extruded materials also agglomerate and wrap around the extended knife blades.

It is known that ultra low melt viscosity polymers are useful for the production of a variety of products such as adhesives, sealants, coatings, non-woven fabrics by melt blown fiber processes, injection-molded components made at a high rate, etc. An ultra low melt viscosity polymer has a melt viscosity of about 300,000 centipoise (hereinafter "cps") or lower. The melt viscosity of an ultra low melt viscosity polymer can be as low as 500 cps or smaller.

The pelletization of extrudable materials is of considerable importance for many applications. Pellets, unlike ingots or bars, readily flow in measuring and dispensing apparatus and the size of pellet charges can be readily controlled to small tolerances. Moreover, unlike powders, they do not form dust and are not ingested by persons working with them. Thus, they provide a highly convenient form for the packaging, storage and use of many thermoplastic polymers, food products, etc.

Pelletization of thermoplastic polymers, especially high melt flow thermoplastic polyolefins, have been particularly difficult using prior art underwater pelletizers. This problem is especially eminent in the production of ultra high melt flow and ultra low viscosity adhesive grade butene-1-ethylene copolymers which contains from about 0.1 to 8 wt % of ethylene which are cracked by a free radical generator. The problem appears to relate to the slow crystallization rate of these polymers which exhibit extreme tackiness in pelletizing. It is known that as the pellets leave the cutting blades, they are very tacky and collide with other pellets to form agglomerates. With a longer residence time, the pellets change to an opaque color, as they complete their crystallization, become dense and lose their tackiness. Excessive turbulence around the trailing edges of the knives also contribute to the agglomeration problem. These agglomerates wrap around the cutting blades and create smears and chunks, plugging the pelletizer chamber, the spin dryer and the area between the die and hub. The extrusion line has to be shut down in order to clean the plugged section resulting in undesirable production interruptions. The agglomerations also result in an excess amount of non-uniform or malformed pellets which may be described by terms such as tailed pellets, long-string pellets, pellet marriages, elbows, dog bones, and pellet trash which are undesirable.

Referring to FIG. 2, U.S. Pat. No. 4,621,996, issued Nov. 11, 1986 and assigned to Gala Industries, proposes a conventional underwater plastic pelletizing machine which includes a number of flat cutting blades 21 mounted on a spoked hub 23 on a driven shaft 25 so that the extruded strand of plastic will be cut into a plurality of pellets. The cutting blades 21 proposed project outward, according to the drawing, from the spoked hub 23. There is a gap 29 between the spoked hub and the die face. This cutter design would not process a high melt flow, adhesive grade polymer properly because polymer smears in long strands and wraps around the cutting blades 21 and sharp edges on the hub 23. This is particularly true when the polymer processed has a relatively low viscosity, high tackiness and long crystallization time which make underwater pelletizing very difficult. It is known that excessive turbulence around the trailing edges of the knives also contributed to the wrapping problem.

It is also known that the extruded polymer pellets are entrapped in the gap 29 between the die face 31 and the hub creating smears and chunks, and thus plugging up the pelletizer. It is not practical to use this prior art pelletizer to pelletize adhesive grade ultra high melt flow polybutene-1-ethylene described above because of the frequency of shut downs required for cleaning up the plugged section.

As used herein, a high melt viscosity polymer is a polymer having a melt viscosity 1,000,000 cps or more; and an ultra low melt viscosity polymer is a polymer having a melt viscosity of about 300,000 cps or lower. A polymer with a melt viscosity of about 300,000 cps will have a melt index of approximately 100 dg/min, and is generally regarded as an ultra high melt flow rate polymer with an ultra high melt index. As used herein, the melt viscosity is measured by Brookfield Viscometer using ASTM D2556 at 350 degrees Fahrenheit (° F.), unless otherwise specified e.g. as measured at 275° F. As used herein, the melt flow rates or melt indices are measured by ASTM 1238 condition E at 190° C. and 2.16 kg wt.

OBJECT OF THE INVENTION

Therefore an object of this invention is the provision of a novel process for pelletizing thermoplastics, particularly ultra low melt viscosity polyolefins, which process involves pelletizing thermoplastic material utilizing an underwater thermoplastic pelletizers will prevent extruded material from agglomerating in a pelletizer.

Another object of this invention is the provision of a novel process which produces thermoplastic polymer pellets, especially low viscosity and high melt flow polymer pellets, with high quality yet avoiding agglomeration in various agglomerate inviting sites such as the gap between the die face and the cutting hub, the sites where the cutting blades are mounted, around the cutting blades, the area between the inner surface of the cutting blades and the hub, etc.

The above and other objects are accomplished by novel features of the present invention which will become apparent from the following description, having reference to the annexed drawings.

SUMMARY OF THE INVENTION

In accordance with the present invention, the problems and disadvantages of the prior art process using the prior art pelletizer, as described above, are avoided or at least minimized by providing a process for pelletizing thermoplastic material in a liquid medium using a novel underwater pelletizer having (a) a novel shroud element to prevent the trapping of polymer between the cutting assembly and the die, and (2) a novel knife design which avoids polymer agglomeration around the knives. The process comprises the steps of:

(a) extruding said molten thermoplastic material through an extrusion die plate to produce a strand of thermoplastic material, which die plate comprising:
a die face at downstream side of the die plate;
a die ring formed on the downstream side of the die face; and
a channel means extending from upstream side of the die plate and the die ring to the die face adapted to deliver the thermoplastic material from the upstream side of the die plate to the die face for extrusion, and said channel means forming an orifice in the die ring for extruded material to exit the die plate; and (b) cutting said strand of thermoplastic material into pellets using a cutting assembly mounted for rotation adjacent the die face, said cutting assembly comprising:
a hub attachable to a driving shaft for rotation in space relation with the die face;
a cutting element mounted on the hub for rotation therewith, said cutting element having a cutting edge for movement adjacent a downstream surface of the die ring; and
a shroud element having a surface corresponding to a surface on said extrusion die such that an interface is established between the cutting assembly and the extrusion die which permits free rotation of the cutting assembly and forms a barrier to prevent pellet migration between the die face and the hub.

The invention also provides an underwater pelletizer as used in the process described above.

The foregoing and other aspects, features and advantages of the present invention will be apparent from the specification which follows.

DESCRIPTION OF THE EMBODIMENTS

The present invention in its broadest scope relates to a process for pelletizing an extrudable material using a pelletizing assembly having a first surface on the cutting assembly corresponding to a second surface on the extrusion die plate such that an interface is established between the cutting assembly and the extrusion die which permits free rotation of the cutting assembly and forms a barrier to prevent pellet migration between the die face and the hub and/or agglomerate inviting sites. The first surface can be a barrier element. In the alternative, the second surface can be a barrier element.

The present process involves pelletizing of a molten thermoplastic material, particularly an ultra low viscosity thermoplastic material in a liquid medium using a novel underwater pelletizer having (a) a novel shroud element to prevent the trapping of polymer between the cutting assembly and the die, and (2) a novel knife design which avoids polymer agglomeration around the knives.

Figure 1:
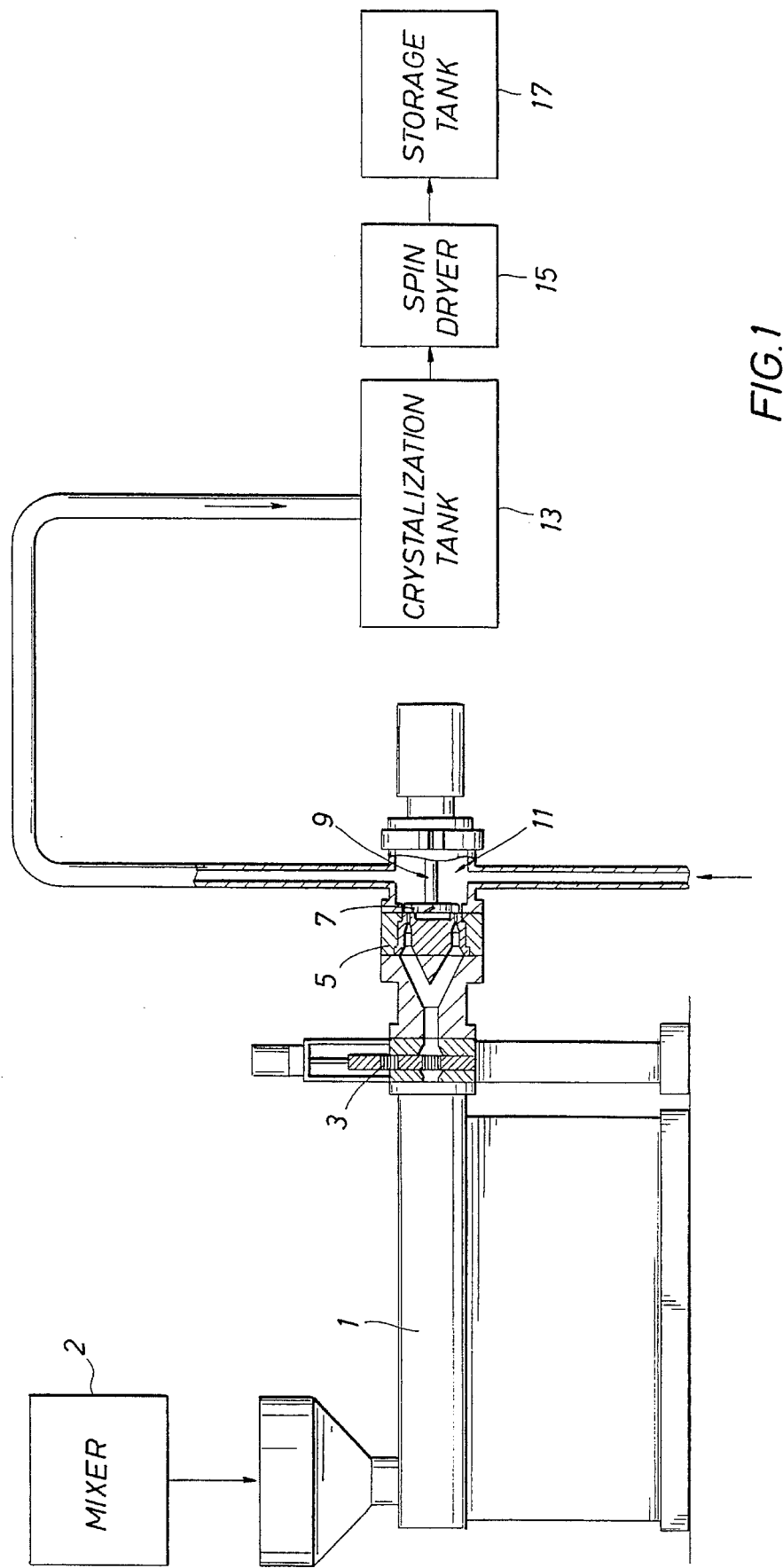
FIG. 1 is a process flow diagram of the pelletizing process of the present invention.

Referring to the accompanying drawing, FIG. 1, according the present process, thermoplastic feed stock, typically produced from a reactor, is introduced into an extruder 1 to be heated to a molten fluidic material. The molten thermoplastic material is passed through a screen changer 3 to screen off metals, gels, dirt, wood chips, etc. It is continuously extruded through the orifices of the die ring located on a die plate 5 in the form of hot thermoplastic rods or strands and are cut into short lengths or pellets by the knives operatively in contact with the die ring. The knives are mounted on a hub 7 driven by a shaft 9. The pelletizer is immersed in a liquid coolant, such as water. The pellets are quickly cooled by the liquid coolant such as water and carried in suspension from the housing 11 to a crystallization tank 13. The pellets are subsequently dried with a spin dryer 15 and sent to a storage tank 17.

Referring to FIGS. 3–12, the present invention relates to a process for pelletizing thermoplastic polymers using an underwater pelletizer having a shroud 33, fixedly mounted on the circular hub to prevent agglomeration in various agglomerate inviting sites in the pelletizer such as the gap between the die face and the cutting hub, the sites where the cutting blades are mounted, areas around the cutting blades, the area between the inner surface of the cutting blades and the hub, etc.

The present invention will be described and illustrated by the following embodiments, which are provided for illustration purpose only and not intended to limit the scope of the instant invention.

Reference is first made to FIGS. 3–10 which illustrate an improved process according to the first embodiment of the present invention.

Figure 3:
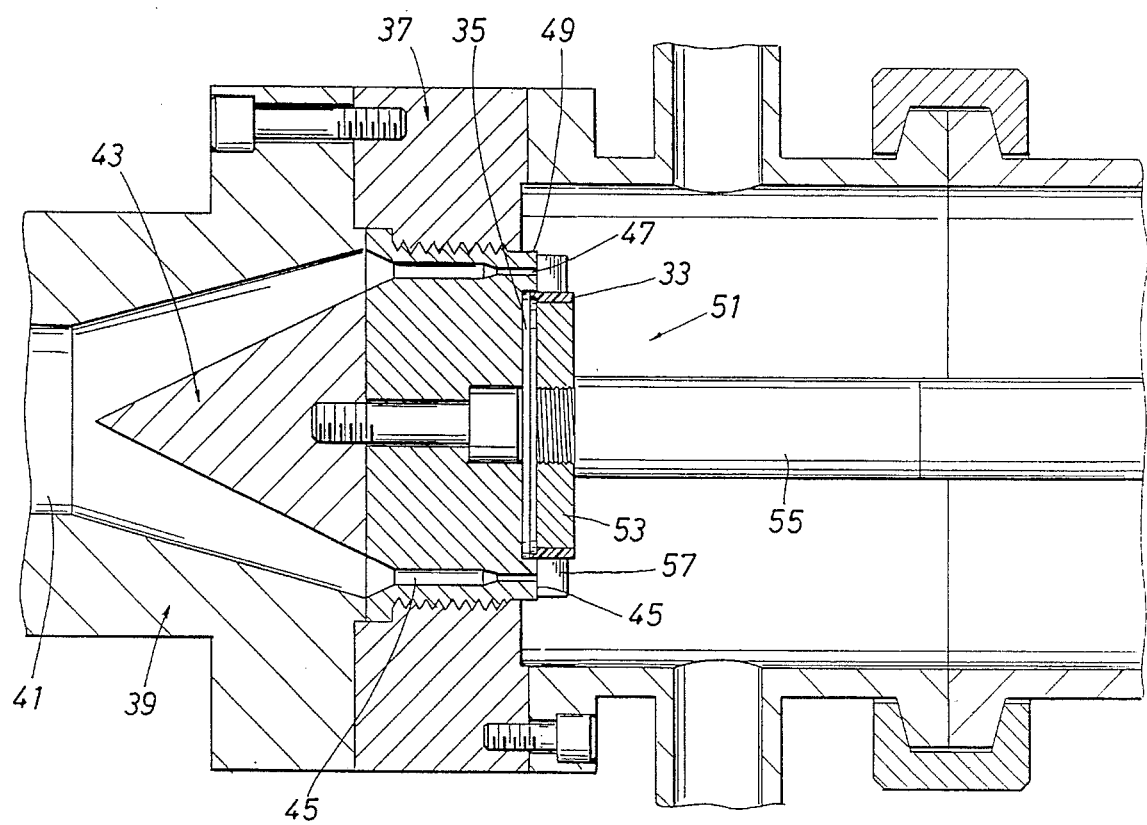
FIG. 3 is a vertical sectional view of a pelletizer used in the first specific embodiment of the present invention having a shroud of an annular ring fitted to the outer periphery of the cutting hub. The outer periphery of the shroud is held to a close clearance to the inner diameter of the raised die ring to effect a barrier against pellet migration. The cutting blades are contoured to conform to the outer periphery of the shroud eliminating any gaps between the cutting blades and the outer periphery of the cutting hub.
Figure 4:
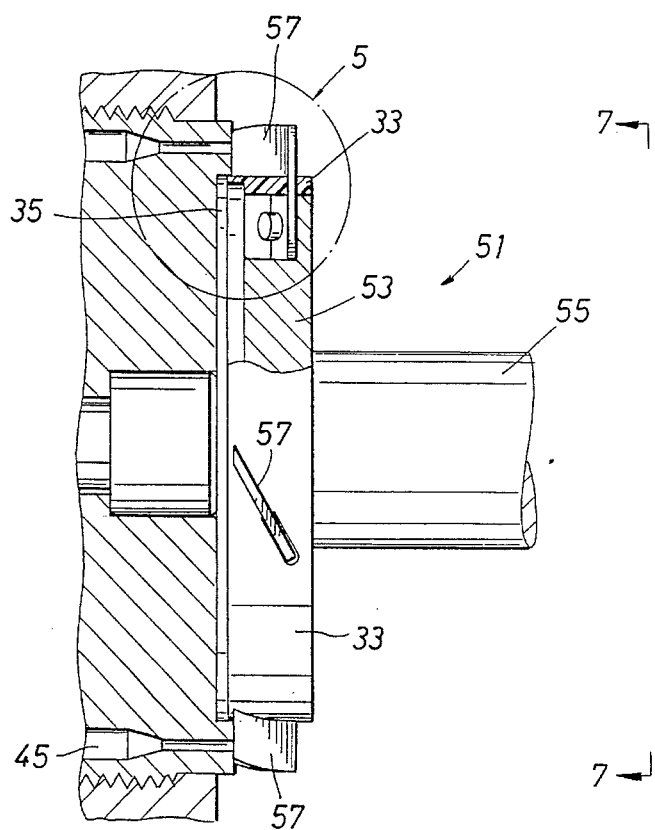
FIG. 4 is a partially sectional view of the arrangement of the shroud, cutting hub, die ring and cutting blades used in the first specific embodiment of the present invention.

Referring to FIG. 3, the process pelletizes thermoplastic polymers using a pelletizer comprises, in substance, a die plate 37 having a plurality of circumferentially spaced and radially disposed bores or recesses 39 which receive electrically operated heating cartridges for heating die plate in a well known manner. The die plate can also be steam heated via channels formed in the die. The die plate 37 includes an inlet passageway 41 for extrudable material such as thermoplastic polymer which is diverted by a nose cone 43 through a plurality of channels 44 so that the extrudable material is extruded in a continuous ribbon or strand from the orifices 47 of the die face 45 which is the downstream side of the die plate. The die face 45 is provided with a wearable surface forming a circular die ring 49 projecting outwardly from the die face toward the hub, i.e. elevated or raised from the die face. Since the wearable surface on the die ring is elevated or projecting outwardly from the die face, it forms a recess or a bowl shaped cavity 35 which invites agglomeration of the pellets. The die ring 49 has a width which is substantially equal to that of the cutting edge of the cutting blades 57 thereby establishing an even wear of the cutting edge of the cutting blades and the die ring, as cutting blades 57 are wearing against the die ring 49 during the pelletizing operation. When the cutting edge of the cutting blades 57 are wider than the die ring, the cutting edge of the blades would not wear evenly. This can lead to a "crowning" of the inside and/or outside edges of the die and possible damage to the die plate body as the knives wear into softer material.

When the cutting edge of the cutting blades are narrower than the die ring, there would be groove formation on the die ring over which a new cutting blade 57 may not track properly on the die ring.

Figure 7:
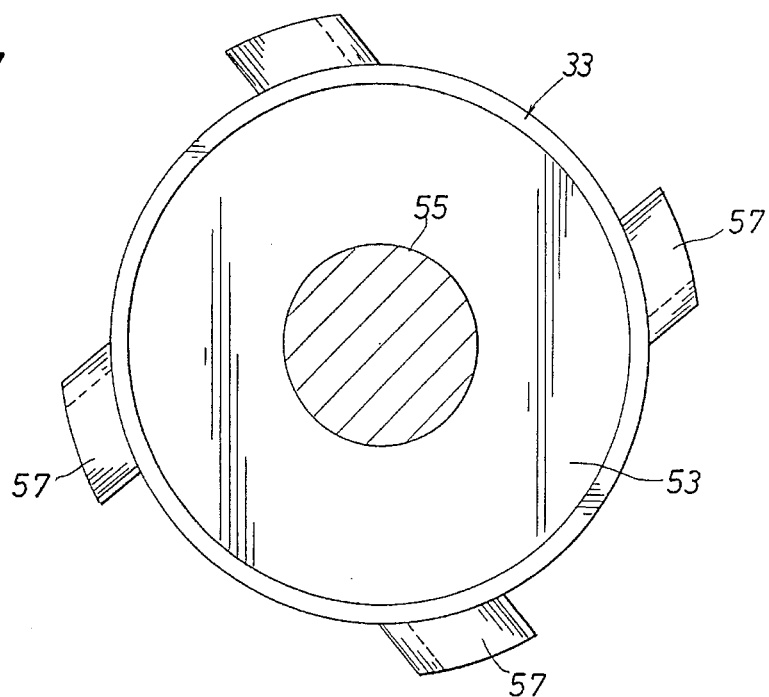
FIG. 7 is a front view on the line 9—9 of FIG. 4, viewing from the side furthest from the die according to the first specific embodiment of the present invention.
Figure 8:
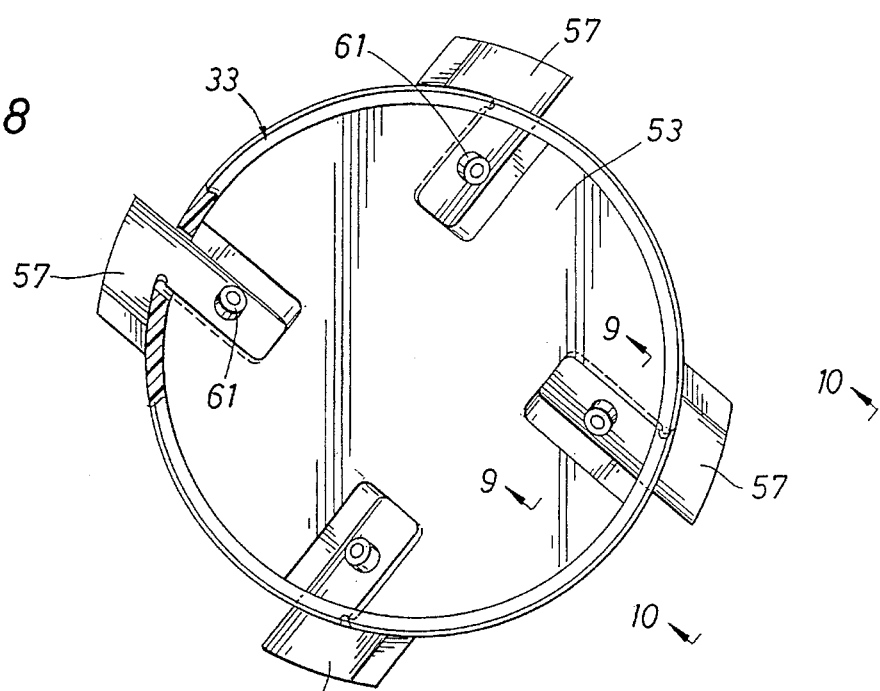
FIG. 8 is a rear view of the cutting hub of FIG. 7 viewing from the side closest to the die.

Associated with the wearable surface, formed on the die ring 49, is a multi-bladed rotatable cutting assembly 51. Referring to FIGS. 7 and 8, the cutting assembly 51 includes cutting blade(s) 57 mounted on a circular hub 53 for rotation. The hub is attachable to a shaft 55 (see FIGS. 3–4) having a center axis of rotation and rotatable coaxially to the die face 45, so that the extruded ribbon or strand of material will be cut into a plurality of pellets. The sizes and dimensions of all the parts depend upon the size of the pelletizers. The number of cutting blades mounted on the cutting assembly also varies with the type and size of the pelletizer, non-limiting range of the number of blades is from 1 to about 500.

Figure 9:
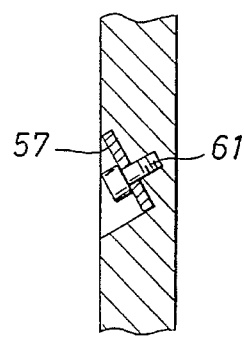
FIG. 9 is a fragmental section on the line 9—9 of FIG. 8 illustrating the mounting of the cutting blade to the cutting hub of FIG. 8.
Figure 10:
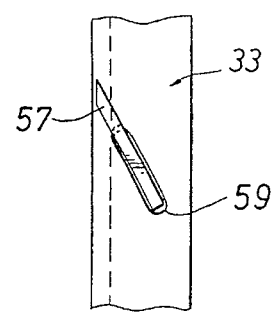
FIG. 10 is a fragmental side-view on the line 10—10 of FIG. 8 of the cutting assembly of FIG. 8 showing the shroud extending slightly beyond the cutting plane of the cutting blade, and the bottom portion of the annular ring being thinner than the upper portion.

As a specific aspect of the first embodiment of the present invention, the pelletizer used has a protective ring element of shroud element 33 such as skirt-like annular ring or liner is snugly fitted to the outer periphery of the hub 53. The shroud 33 has a slot 59 to permit the insertion of the cutting blades which are mounted on the hub 53 by any suitable means such as a bolt or screw 61 as shown in FIG. 9.

Figure 5:
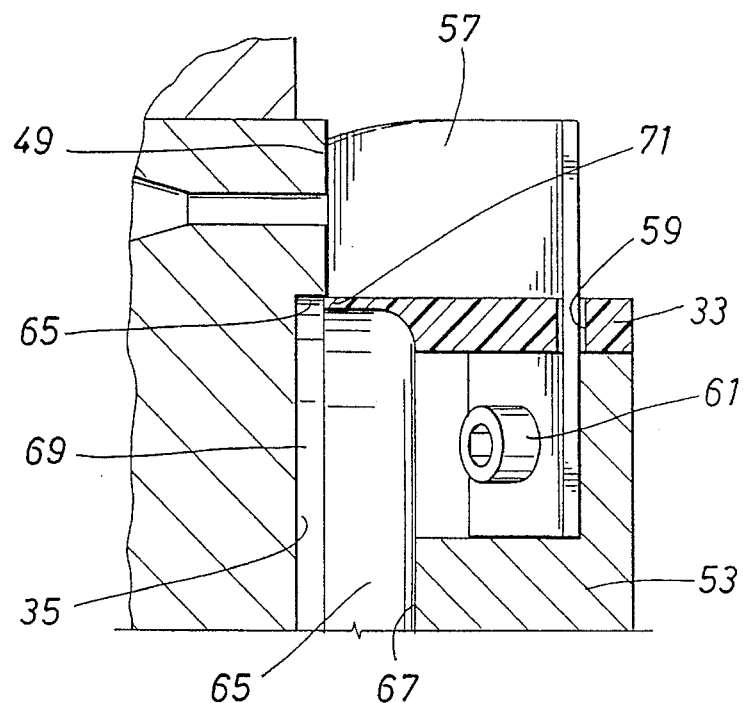
FIG. 5 is a fragmental section on the line 5—5 of FIG. 4, on an enlarged scale, showing the interface of the shroud, cutting hub, die ring and cutting blades when a cutting blade is relatively new. The edge of the shroud is not in contact with the bottom surface of the recess of the die face.
Figure 6:
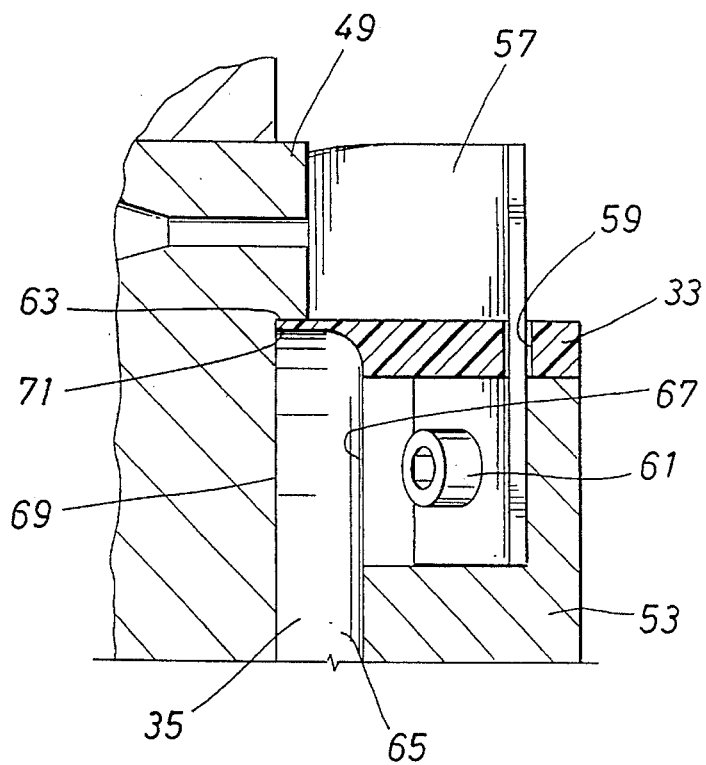
FIG. 6 is a fragmental section on the line 5—5 of FIG. 4, on an enlarged scale, when a cutting blade has been worn and the cutting hab has been advanced. The edge of the shroud is wearing against the bottom of the recess of the die face.

Referring to FIG. 5 and 6, the outer diameter of the shroud 33 is substantially equal to the inner diameter of the die ring 49 thereby allowing the cutting edges of the cutting blades 57 to be in close contact with the wear surface of the die ring 49. In pelletizing operations, the cutting blades rotate with the hub following the die ring as the track. Preferably, a minimal clearance exist between the shroud and the die ring to permit free rotation. The outer periphery of the shroud is held to a close tolerance to the inner diameter of the die ring to effect a barrier against pellet migration.

As non-limiting illustrative example, the outer diameter of the shroud is slightly smaller, e.g. from about 0.01 mm to about 0.25 mm smaller, than the inner diameter of the die ring to allow a portion of the skirt 63 adjacent to the die ring to be inserted or protruded in to the bowl-like recess or cavity in the center of the die ring. In a non-limiting example of the hub design of the first specific embodiment of the present invention, the inner surface of the hub 67 is downstream from the cutting plane of the cutting blade and thereby forming a gap 65 between the inner surface of the hub 67 and cutting plane or downstream surface of the die ring. The shroud substantially covers the bowl-shaped recess or cavity 35 thereby preventing the pellets from entering the recess or cavity 35 and the space 65 under the hub.

Figure 2:
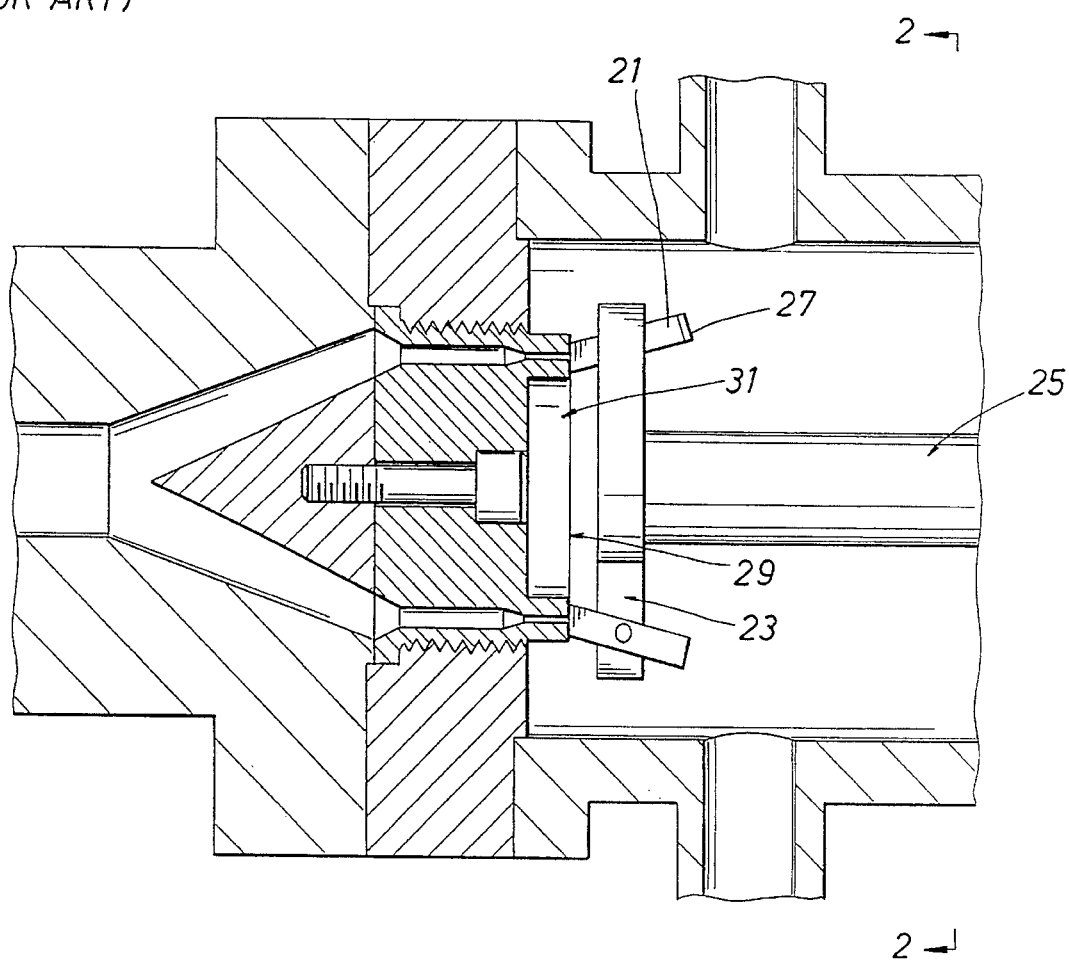
FIG. 2 is a vertical sectional view of the prior art underwater pelletizer, disclosed in U.S. Pat. No. 4,621,996, with flat cutting blades mounted on a spoked hub secured on a driven shaft. There is a gap between the spoked hub and the die face.

In a prior art process using a prior art pelletizer as shown in FIG. 2, without the shroud, the pellets, especially high melt flow thermoplastic polymers having slow crystallization rate, tend to agglomerate within the gap or chamber between the inner surface of the hub 67 and the bottom surface 69 of the recess. The present process uses a pelletizer having a shroud 33 which forms a seal or barrier thereby effectively prevents the pellets from entering the gap between the inner surface of the hub 67 and the bottom 69 surface of the recess thereby substantially prevents pellet recirculation under the hub, thus eliminating agglomeration of the pellets in the gap and the inner surface 67 of the hub. The cutting blades are bolted on the inner side of the hub, thus there are no notches, slots or screw head for the polymer to hang on. Since the shroud also prevents pellets from entering the inner surface 67 of the hub, the shroud 33 thus prevents pellet agglomeration at the screw 61 and the area adjacent to the screw which would otherwise invite trapping and agglomeration of the polymer.

As a specific embodiment of the first embodiment of the present invention, a portion of the shroud 71 at the upstream side facing the die protrudes into the recess formed by the die ring. During the pelletizing operation, the cutting blades wear against the bottom surface 69 of the recess when the cutting blades along with the hub are advanced toward the die to compensate for the reduction in the length of the blade caused by the wearing of the cutting blades. FIG. 5 shows an edge 71 of the shroud not in contact with bottom surface of the recess 69 of the die face when the cutting blades are relatively new.

FIG. 6 illustrates the wearing of the edge of the shroud 71 against the bottom of the recess 69, when a cutting blade has been worn and the cutting hub has been advanced.

As another specific embodiment of the first embodiment of the present invention, a portion of the shroud 71 at the upstream side facing the die is thinner than the remaining portion of the shroud thereby reducing the amount of scrap material generated from the wear of the shroud.

The shroud used in the present process is made of any suitable material. Where the shroud is wearable, it is preferred that the shroud is made of a material compatible with the material for making the pellets. Non-limiting examples of such materials include polyethylene, polypropylene, Teflon (tetrafluoroethylene fluorocarbon polymers or fluorinated ethylene-propyelene resins), nylon, phenolic resin, polyacrylic polymer, polyester, polycarbonate, etc.

The cutting blades 57 are mounted to the hub, preferably to the inner surface of the hub and rotate during a pelletizing operation in close contact with the downstream surface of the die ring 49. Since the pellets are prevented from contacting the inner surface by the shroud, mounting the cutting blades to inner surface 67 effectively prevents the agglomeration of the pellets around the bolts and screws 61.

The cutting blades 57 engage the surface of the die ring at an angle selected from about 10° to about 60°, preferably from about 20° to about 40°, and still more preferably from about 30° to about 36°. A low incident angle not only enables a clean cut, instead of smearing, of the extrudate but also minimizes turbulence in the surrounding cooling water. Turbulence in the cooling water is undesirable because it results in sharp changes in flow directions which tends to both distort still molten pellets and can lead to pellet recirculation and agglomeration in stagnant areas. The low incidence angle used in the present cutting assembly also reduces or eliminates the cavitation zone that forms in the zone behind the cutting blades. Other prior art blunt designs with higher incidence angles may lead to the formation of a vapor pocket on the trailing edge of the knives. This vapor pocket rotates with the blades and acts as an insulating medium between the surrounding cooling water and the face of the die ring. As a consequence the die face runs hotter than if cooling water was in contact with the die, thereby increasing the likelihood of smearing of the extruded material and producing non-discrete pellets.

The cutting blades used in the present process have cutting edges parallel to plane of rotation of the hub. The width of the cutting edge of the cutting blade is substantially equal to that of the die ring, and the cutting blades have inner edges contoured to conform in its angular position to curvature of the outer periphery of the shroud and are in continuous contact with the outer periphery of said shroud thereby substantially eliminating gap between inner surface of cutting blade and the outer periphery of the shroud. The outside edges of the cutting blades are contoured in the same curvature as the inner edges so that the width of the cutting edges remain constant as the cutting blades wear.

Figure 11:
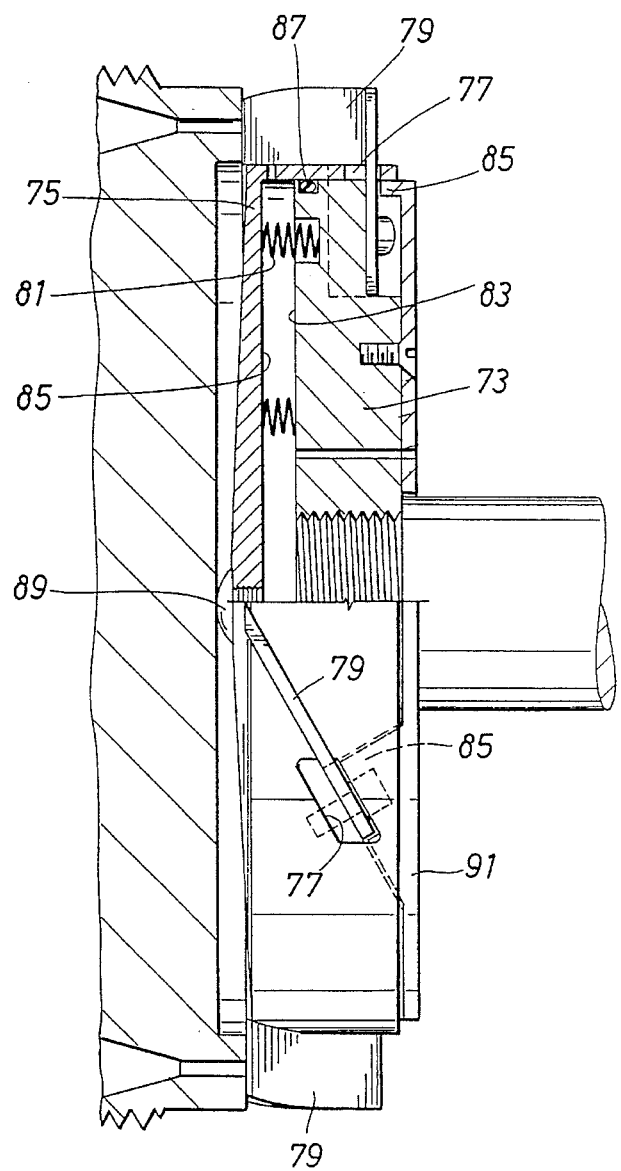
FIG. 11 is a fragmental sectional view, of the cutting assembly used in a second specific embodiment of the present invention having a cup shaped shroud which does not change position as the cutting blades are worn and advanced. Cutting blades are bolted to the outer surface of the cutting hub and a backcover is bolted to the outer side of the cutting hub to prevent pellet agglomeration at the outer side of the cutting hub. The backcover has a skirt to close the gap in the slot for insertion of the blade, said gap is formed from hub and blade advancement as cutting blades are worn.
Figure 12:
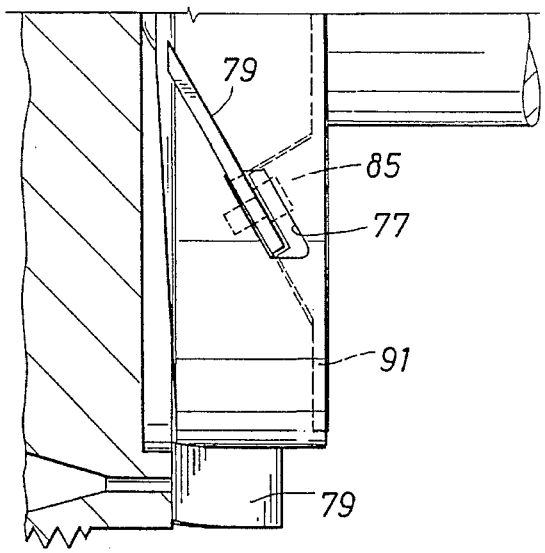
FIG. 12 is a fragmental sectional view of the cutting assembly of FIG. 11 showing the cutting hub advanced toward the die face as the cutting blades are worn and advanced while the shroud remains at the same position.

Reference is now made to FIGS. 11–12 which show another form of pelletizer utilized in the second embodiment of the present invention.

As there shown, the cutting assembly utilized comprises a backplate or hub 73 of circular configuration having a cup-shaped shroud 75 fixedly mounted on the outer periphery and inner surface of the cutting hub. The cup-shaped shroud has a slot 77 at the outer periphery of said shroud to permit the insertion of the cutting blades 79. Spring(s) 81 are secured between the inner surface of the hub 83 facing the die and inner bottom side 85 of the cup-shaped shroud to keep the cup-shaped shroud in the desired position relative to the die plate when the hub along with the knives are advanced toward the die to compensate for wearing of the knives 79.

Similar to the shroud used in the first embodiment of the present invention, the cup-shaped shroud element has an outer diameter substantially equal to the inner diameter of said die ring thereby allowing said cutting edge of the cutting element moving adjacent the downstream surface of the die ring, and an interface is established between the shroud and the surface of the die ring which permits free rotation of the cutting assembly and forms a barrier to prevent pellet migration between bottom surface of the cup-shaped shroud and the bottom surface of said recess on the die face.

The cutting blades are secured to the outer surface of the hub, and said slot on the outer periphery of the shroud for insertion of the cutting element has a size and a shape with sufficient clearance adapted to allow advancement of the hub and the cutting element affixed thereto to compensate for the wear of the cutting edge of the cutting blades. The shroud touches the bottom surface of the recess on the die face via a hard button 89 to minimize wear and friction.

There is a backcover 91 secured to the hub having the outer diameter substantially equal to the outer diameter of the hub to prevent thermoplastic material from agglomerating at the outer surface of the hub and at the sites where the cutting blades are affixed to the hub.

As a specific aspect of the second embodiment, the backcover has an axial extension 85 adapted to cover the a hole in the slot located on the outer periphery of the shroud formed from the advancement of the hub, thereby reducing the areas where pellets can agglomerate. In this embodiment, as the cutting blades or knives wear from close contact with the die ring, the hub and the cutting blades are advanced toward the die with the springs(s) 81 being pressed to a shorted length. As shown in FIG. 12, the relative position of the shroud to the die remains unchanged as the hub is advanced. An O-ring 87 located between the inside of the cup-shaped shroud and the outer periphery of the hub serves to provide sufficient friction to cause the shroud 75 to rotate with the hub 73 driven by the shaft during pelletizing operation, as well as center of the shroud with respect to the hub.

Suitable material for the non-wearing type of shroud can also be made of the polymers described above or metal, such as stainless steel, aluminum, brass, bronze, etc.

The third embodiment of the present invention relates to a an underwater pelletizer adapted to prevent thermoplastic material from agglomerating in a pelletizing assembly as described above.

ILLUSTRATIVE EMBODIMENT

Referring to FIG. 1, a polymeric feedstock comprising an ultra low melt viscosity thermoplastic butene-1-ethylene copolymer containing from about 5.5 to about 6.0 wt % of ethylene having a melt index of from about 0.1 to about 45 dg/min measured by ASTM 1238 condition E was first mixed with about 4000 ppm of Lupersol 101 Peroxide and about 0.09% by weight of Irganox 1076 (Octadecyl 3,5-di-tert-butyl-4-hydroxyhydrocinnamate) in a Henschel mixer 2. The mixture was passed through a 70 mm twin screw extruder 1 at from about 600 to about 1000 lbs/hr at about 100° C. to 200° C. and cracked by the peroxide to an ultra high melt flow rate polymer having a melt flow rate of about 150 to about 250 dg/min. The mixture was extruded using the pelletizer having 4 cutting blades according to the first embodiment of the present invention as shown in FIGS. 3–10. The die body temperature was about 120° C. and the melt temperature at the die was about 105° C. The pelletizer speed was about 2000 rpm.

The die hole diameter was about 0.093 inch. There were about 50 open die holes on the die ring. Die hole flow rate was about 12–20 lbs/hr/hole. The temperature of the water in the pelletizer housing 11 was maintained at about 10° C. to about 15° C. in the pelletizer housing 11. The crystallization tank had about 1200 gallons of water.

The underwater pelletizer produced 50,000 lbs of ultra low viscosity polymer pellets without shut-down of the extrusion/pelletization line due to plug-up of the pelletizer. There were no over sized pellets recovered at the screen before the crystallization tank. This indicates the pelletizer produced substantially no oversized pellets in addition to no plugging of the pelletizer. There were only 1000 lbs of "overs" which are oversized pellets formed in the crystallization tank.

This compares favorably over the a comparative run on same feedstock using a prior art pelletizer described in the Background of Invention, which was unable to pelletize the ultra high melt flow rate polymer due to plugging of the polymer between did and hub and the wrap around of polymers on the knives.

In each of the foregoing embodiments, the number of blades of the rotary cutter member should by no means be limited to the illustrated examples and may be any other number which is more than one.

The ranges and limitations provided in the instant specification and claims are those which are believed to particularly point out a distinctly claim the instant invention. It is, however, understood that other ranges and limitations that perform substantially the same function in substantially the same manner to obtain the same or substantially the same result are intended to be within the scope of the instant invention as defined by the instant specification and claims.

I claim:

1. A process for pelletizing a molten ultra low melt viscosity thermoplastic material having a melt viscosity of 300,000 cps or lower in a liquid medium, said process comprising the steps of:

(a) extruding said molten ultra low melt viscosity thermoplastic material through an extrusion die plate said die plate comprising:
        a die face at a downstream side of the die plate;
        a die ring formed on a downstream side of the die face, said die ring having a wear surface projecting outwardly from the die face and having a recessed cavity in the center of said projecting surface of said die ring, said recessed cavity having a bottom surface facing an inner surface of a hub; and
        a channel means extending from an upstream side of the die plate and the die ring to the die face, and said channel means forming an orifice in the die ring for said extruded material to exit the die plate;
        wherein said molten ultra low melt viscosity thermoplastic material is delivered from the upstream side of the die plate to the die face through said channel means and exits said die plate through said orifice in the die ring to form an extruded strand of said ultra low melt thermoplastic material; and (b) cutting said extruded strand of ultra low melt viscosity thermoplastic material into pellets using a cutting assembly, said cutting assembly comprising:
        said hub connected to a driving shaft;
        cutting blades mounted on the hub, said cutting blades having cutting edges; and
        a shroud element fixedly mounted on an outer periphery of the hub, said shroud element having a slots for inserting and affixing the cutting blades to the inner surface of the hub, wherein said shroud element substantially covers said recessed cavity of said die ring, said shroud element having an outer diameter substantially equal to an inner diameter of said recessed cavity thereby allowing said cutting edges of the cutting blades to move adjacent the downstream surface of the die ring, wherein substantially all the cut pellets are prevented from entering the recessed cavity by causing a portion of the shroud element to protrude into the recessed cavity of the die ring, the outer periphery of said shroud element being in close proximity to the inner diameter of the recessed cavity to provide a barrier against migration of said pellets into said recessed cavity, wherein said process further comprises advancing said shroud element and said cutting assembly toward the die ring to compensate for wearing of the cutting blades; wherein said shroud portion protruding into the recessed cavity reduces in size through grinding of said shroud portion against the bottom surface of said recessed cavity as said shroud element and said cutting assembly advances.

2. The process as described in claim 1, wherein the process further comprises causing substantially no agglomeration of the ultra low melt viscosity thermoplastic material between inner edges of the cutting blades and said outer periphery of the hub by providing each of said inner edges with a contoured surface which conforms to an angular curvature of the outer periphery of said shroud element, said inner edges being in continuous contact with the outer periphery of said shroud element thereby substantially eliminating any gap between the inner edges of said cutting blades and the outer periphery of the shroud element, and said hub is a circular plate having a center axis of rotation and rotating coaxially to the die face, said hub having said inner surface facing the die face, an outer surface adjacent the shaft.

3. The process as described in claim 2, wherein said process further comprises providing:

(i) a reduction of smearing of the cut thermoplastic pellets,
    (ii) a reduction of turbulence in cooling water surrounding said cutting blades, and
    (iii) a reduction of a cavitation zone that forms in a zone behind the cutting blades by causing said cutting blades to engage the surface of the die ring at an angle selected from about 10° to about 60° and providing said cutting blades with said cutting edges parallel to a plane of rotation of the hub.

4. The process as described in claim 3, wherein the protruding portion of the shroud element at a side facing the die plate is thinner in width than a remaining portion of the shroud element thereby reducing an amount of scrap material generated from said wearing of the protruding shroud portion.

5. The process as described in claim 4, wherein said shroud element is made from a polymer.

6. The process as described in claim 5, wherein said polymer is selected from the group consisting of polyethylene, polypropylene, tetrafluroethylene fluorocarbon polymers, fluorinated ethylene-propylene resins, nylon phenolic resin, polyacrylic polymer, polyester, and polycarbonate.

7. The process as described in claim 6, wherein said process further comprises maintaining a constant width for each of the cutting edges as the cutting blades reduce in size by providing said width to be substantially equal to that of said die ring for each of the cutting edges, and providing each of said cutting blades with an outside edge contoured with the angular curvature of said inner edges.

8. The process as described in claim 7, wherein said cutting blades engage the surface of the die ring at an angle selected from about 30° to about 36°.

* * * * *